3,411,702
CONTROLLING GAS COMPRESSION SYSTEMS
Melvin O. Metot, Canastota, and Henry P. C. Gregor,
Syracuse, N.Y., assignors to Carrier Corporation, Syracuse, N.Y., a corporation of Delaware
Filed Mar. 13, 1967, Ser. No. 622,545
10 Claims. (Cl. 230—7)

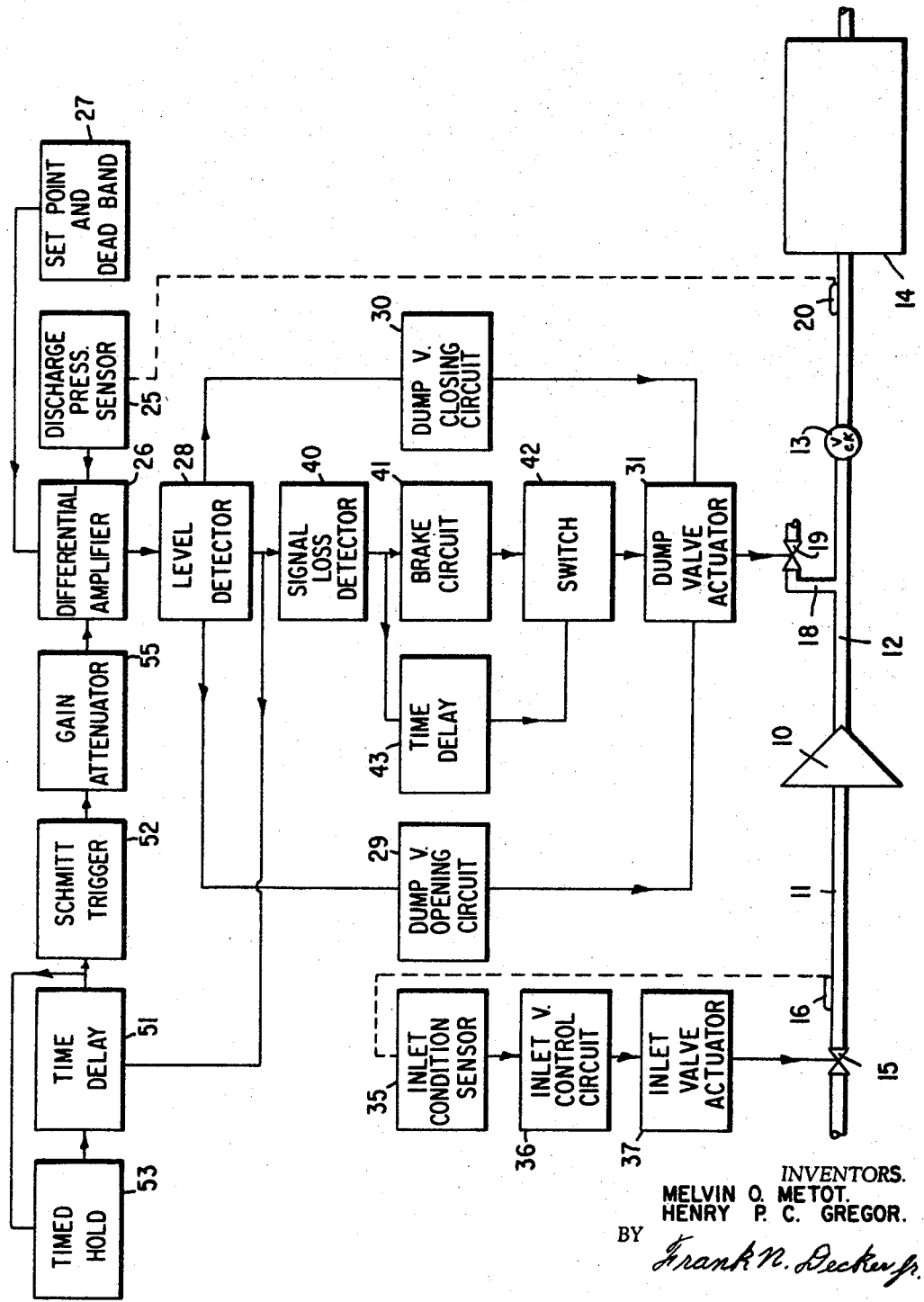

ABSTRACT OF THE DISCLOSURE

A gas compression system having a control system for maintaining a constant discharge gas pressure. The control employs circuitry for positioning a discharge gas dump valve in a manner to maintain the required discharge gas pressure. A motor controlling the dump valve is continuously operated for large deviations from the set point gas pressure and is intermittently repositioned with a full voltage signal for smaller deviations from the set point pressure. The length of the control signal pulses to the motor may be reduced as a function of the closeness to the set point pressure in order to slow the average speed of the adjustment as the control point is reached.

Background of the invention

This application relates to controlling gas compression systems, and more particularly to a method and apparatus for regulating the discharge pressure of a gas compression system.

A gas compression system of the type referred to herein may supply compressed air from a suitable compressed air receiver to various pneumatic tools or pneumatic control systems requiring a source of compressed air having a relatively uniform pressure. The system may employ a centrifugal air compressor which discharges compressed air into the receiver and a dump valve for venting compressed air from the system which is modulated or actuated by a control system so as to maintain a uniform receiver air pressure.

In such systems, it is desirable to provide relatively rapid actuation of the dump valve when the receiver air pressure differs substantially from the desired pressure and to slow down the rate of change of the dump valve when the receiver air pressure is close to the desired pressure so that the system avoids "hunting." While a control system having such a characteristic is desirable, it is generally costly to provide. For example, inexpensive alternating current electrical motors are not easily controlled because their torque-speed characteristic is such that when their speed is reduced by reducing the average voltage or current supplied to them, they may have insufficient torque to accurately position the dump valve over the required range because the motor will stall. This problem may be overcome by using certain types of electrical controls, but prior systems for achieving this result have involved unacceptably complex and expensive control circuitry or mechanism.

Summary of the invention

In accordance with a preferred embodiment of this invention, a control circuit is provided for positioning the dump valve which employs an inexpensive alternating current, valve actuator motor. A compressed discharge gas pressure sensor provides a compressed gas pressure signal which is compared against a desired set point pressure signal to provide an error signal having a magnitude corresponding to the difference between the actual pressure and the desired pressure. The error signal is passed to a level detector which responds to an error signal level indicative of a need to reposition the dump valve. The level detector transmits a control signal to a dump valve opening circuit and a dump valve closing circuit to properly position the dump valve actuator motor upon detection of the predetermined error signal level.

Upon the termination of the control signal from the level detector, a braking circuit is actuated to transmit a braking signal to the dump valve actuator to stop the actuator and thereby prevent excessive hunting or overshoot of the dump valve.

A time delay circuit is provided to switch off the braking signal a relatively short time after its occurrence so that the dump valve actuator is not overheated by the continued presence of a brake signal.

In addition, an error signal attenuator circuit is provided which attenuates the error signal after a period of time following the occurrence of a control signal from the level detector. Consequently, as the dump valve closely approaches the position at which the proper set point pressure is achieved in the system, the attenuated error signal will eventually be reduced to a level which is insufficient to provide a control signal output from the level detector and the braking circuit will stop the dump valve actuator. A timed holding circuit is provided to continue to attenuate the error signal for a period of time after the occurrence of the control signal output from the level detector. After this period of time has elapsed, the attenuator is switched out of the control circuit so that another control signal can be supplied from the error signal level detector in the event that the unattenuated error signal has a level great enough to provide a control signal output from the level detector. The sequence of providing a control signal, switching in the attenuator for a period of time, braking the dump valve actuator, and thereafter switching the attenuator out of the circuit is repeated until the dump valve reaches a position so that the error signal is within a preselected dead band indicative of no further need of repositioning the dump valve. The length of the control signal may be proportionally reduced as the dead band is approached to give a more precise control characteristic.

By employing the control system and method described herein, the dump valve is quickly repositioned to a new required position but is slowed down as the compressed gas discharge pressure of the system reaches the set point pressure. However, in the event that the error signal is large, the dump valve actuator will be quickly moved toward the new required position because the error signal, even in its attenuated condition, is large enough to provide full voltage control signal output from the level detector. An important advantage of the arrangement described is that the dump valve actuator may be a simple alternating current motor such as a permanent split capacitor motor which provides full torque output at all times when it is energized and is immediately braked when the control signal to the motor is removed.

Brief description of the drawings

The figure is a schematic block diagram illustrating the control functions employed to achieve the objects of this invention in a gas compression system.

Description of the preferred embodiment

Referring particularly to the figure, there is shown a gas compression system employing a centrifugal compressor 10 having an inlet passage 11 for ambient air and a discharge passage 12 for passing compressed air through a check valve 13 into a receiver 14 for distribution to various pneumatically operated equipment requiring a source of uniform high pressure air. A modulating inlet valve 15 is provided in inlet line 11 to regulate the passage of air to compressor 10. A bypass line 18 is connected into discharge line 12 and is provided with a modulating dump valve 19 for regulating the discharge pressure in receiver 14 by venting compressed air. A suitable location 16 is provided for inlet air condition sensors, and a suitable location 20 is provided for a compressed discharge pressure sensor.

A main control is provided for dump valve 19 which is responsive to a compressed discharge gas pressure sensor 25, such as a pressure transducer, positioned at location 20. The compressed gas discharge pressure sensor 25 provides a discharge pressure signal which is a function of sense discharge gas pressure to a differential amplifier 26. A set point signal which is functionally related to the desired discharge gas pressure in receiver 14 is provided by circuit 27 which provides a set point signal to differential amplifier 26. In addition, a suitable dead band signal may be provided to differential amplifier 26 by circuit 27 to provide a range of discharge pressures which are sufficiently close to the desired set point pressure so that no adjustment of dump valve 19 is required.

Differential amplifier 26 compares the discharge gas pressure signal with the set point pressure signal and provides an error signal to level detector 28 which is a function of the difference between the desired pressure and the sensed pressure in receiver 14. Level detector 28 provides a dump valve opening signal or a dump valve closing signal to dump valve opening and closing circuits 29 and 30 in the event that the error signal from differential amplifier 26 exceeds a predetermined level indicative of a need to reposition the dump valve. Dump valve opening circuit 29 and dump valve closing circuit 30 in turn provide an opening or closing signal to dump valve actuator 31 which repositions dump valve 19.

In the preferred embodiment of this invention, level detector 28 may comprise a Schmitt trigger which provides a dump valve opening signal or closing signal to gate a bi-directional gated switch such as a Triac in either the dump valve opening or closing circuit. Dump valve actuator 31 preferably comprises a permanent split capacitor motor arranged so that when current passes directly from the Triac in opening circuit 29 to one of its windings and through a capacitor to the other of its windings, the motor moves in a direction to open the dump valve and the reverse function takes place when the Triac in closing circuit 30 is gated.

In addition, the main control circuit may employ an inlet air density control which modulates the position of inlet valve 15 to compensate for variations in the density of inlet air to compressor 10. This control may employ suitable inlet condition sensors 35 responsive to temperature and pressure of the inlet air which provide an inlet air condition signal to an inlet valve control circuit 36 which in turn provides a control signal to inlet valve actuator 37 to properly position valve 15.

In accordance with this invention, additional control circuits are provided to brake dump valve actuator 31 upon the termination of a control signal from level detector 28, and to slow the operation of dump valve actuator 31 as the set point pressure is approached.

To achieve the braking function, level detector 28 provides a control signal to signal loss detector 40 whenever a control signal is passed to dump valve opening circuit 29 or dump valve closing circuit 30. Upon the termination of the control signal from level detector 28, the signal loss detector 40 passes a control signal to brake circuit 41. Brake circuit 41 in turn passes a braking signal through a normally closed switch 42 to dump valve actuator 31. The presence of a braking signal on dump valve actuator 31 immediately stops further adjustment of dump valve 19 to prevent it from overshooting the desired position, thereby overcoming inertial effects in the actuator.

In addition, the control signal from signal loss detector 40 is passed through a time delay circuit 43 which opens switch 42 a predetermined short length of time after the occurrence of a control signal from signal loss detector 40, or in other words after the termination of a control signal from level detector 28. Opening of switch 42 terminates the braking signal to dump valve actuator 31 to prevent overheating of the dump valve actuator.

Signal loss detector 40 may simply comprise a transistor which passes direct current through brake circuit 41 and switching circuit 42 to the winding of the motor in dump valve actuator 31 causing the motor to stop. Switch 42 may comprise a silicon-controlled rectifier which both controls the passage of the braking current and serves to rectify an alternating current to provide the direct current required for the braking signal. Time delay circuit 43 may comprise a resistance-capacitance circuit having a time constant which serves to remove a positive voltage from the gate of the silicon-controlled rectifier in switch 42 from brake circuit 41 to switch the silicon-controlled rectifier to a nonconducting state after about four cycles of rectified alternating current having passed to dump valve actuator 31.

The slowing of the dump valve actuator as the desired set point pressure is approached is achieved by additional circuitry which is also actuated by a control signal output from level detector 28. The control signal output is supplied to a time delay circuit 51 which provides a delayed control signal to a Schmitt trigger 52. In addition, the delayed signal from time delay circuit 51 is supplied to a timed holding circuit 53 which continues to supply the signal from time delay circuit 51 to actuate the Schmitt trigger for a period of time after the termination of the control signal output from level detector 28. Schmitt trigger 52 supplied control signal to switch a gain attenuator 55 into differential amplifier circuit 26 to attenuate the gain of the differential amplifier.

Time delay circuit 51 and timed holding circuit 53 may comprise a resistance-capacitance network supplying the control signal to Schmitt trigger 52. The resistance-capacitance network is arranged so that one period of time is required to charge the capacitor to a voltage sufficient to actuate Schmitt trigger 52 and a second period of time is required to discharge the capacitor sufficiently to deenergize Schmitt trigger 52, thereby providing the timed holding function. Gain attenuator 55 may comprise a resistive network which is switched into differential amplifier 26 by energizing Schmitt trigger 52 so as to reduce the gain of the differential amplifier, which has the effect of widening the effective dead band of the control system for the period of time that the gain attenuator affects the output of differential amplifier 26.

In describing an example of the operation of the control system, it will be assumed that the pressure sensed by pressure sensor 25 indicates that receiver 14 is substantially below the desired set point pressure. In this event, differential amplifier 26 will provide a high level error signal output due to the large difference between the sensed discharge pressure and the desired set point pressure. This high level error signal is transmited from differential amplifier 26 to level detector 28. Level detector 28 detects the existence of a high level error signal and transmits a control signal to dump valve closing circuit 30 which in turn transmits a dump valve closing circuit signal to dump valve actuator 31 to reposition dump valve 19 and reduce the quantity of compressed air vented from the system. At the same time, a control signal from level detector 28 passes to time delay circuit 51. After a period of time, time delay circuit 51 passes a control signal to Schmitt trigger 52 which the switches gain attenuator 55 into the differential amplifier circuit. The switching of gain attenuator 55 into the differential amplifier will attenuate the error signal supplied to level detector 28. However, if the difference between the sensed discharge gas pressure and the set point pressure is large, level detector 28 will still receive an error signal of a sufficiently large magnitude, even in its attenuated condition, to indicate a need for adjustment of dump valve 19. Consequently, level detector 28 will continue to provide a control signal output to dump valve closing circuit 30 and dump valve actuator will continue to close at full speed. Also, the control signal output of level detector 28 will continue to be supplied through time delay circuit 51 to Schmitt trigger 52 and gain attenuator 55 will remain in the differential amplifier circuit.

As dump valve 19 continues to close and the pressure in receiver 14 rises to approach the set point pressure, the attenuated error signal output from differential amplifier 26 will continuously decrease until it is reduced to a level below that at which level detector 28 provides a control signal output. When the control signal output from level detector 28 is terminated, signal loss detector 40 will provide a braking signal to dump valve actuator 31 as previously described. However, gain attenuator circuit 55 will remain in differential amplifier circuit 26 for a period of time determined by timed holding circuit 53.

After a period of time following the termination of a control signal from level detector 28, timed holding circuit 53 and time delay circuit 51 no longer supply a control signal to Schmitt trigger 52 and gain attenuator 55 is switched out of the circuit of differential amplifier 26. Consequently, the error signal is passed to level detector 28 in an unattenuated condition. If the unattenuated error signal has a magnitude of the predetermined level required to provide a control signal output from level detector 28, another control signal will be provided to dump valve closing circuit 30, which will again actuate dump valve actuator 31. Again, the control signal output from level detector 28 is supplied after a period of time through time delay circuit 51 to Schmitt trigger 52, thereby switching gain attenuator 55 back into the circuit of differential amplifier 26. Assuming that the difference between the sensed discharge gas pressure and the set point pressure is now relatively small, the attenuated error signal will again be insufficient to produce a control signal output from level detector 28 and dump valve actuator 31 will be braked and gain attenuator circuit 55 will remain in the differential amplifier circuit for a period of time determined by timed holding circuit 53.

The described sequence of events will continue to be repeated so that dump valve actuator 31 will be moved for a period of time in the opening direction, will then be braked, and will continue to be deenergized for a period of time. This sequence will continue until the unattenuated error signal from differential amplifier 26 decreases to a level which will no longer cause level detector 28 to provide a control signal output. It will be apparent, therefore, that dump valve 19 will continue to close until the pressure in receiver 14 reaches a pressure within the dead band provided by circuit 27, at which time no further adjustment of the dump valve is required.

It may be desirable to provide a timing means in the circuit of differential amplifier 26 so that the length of time that the error signal is on is varied as a function of the closeness of the discharge pressure to the dead band or set point pressure. Under these conditions, the length of the error signal and the resulting control signal is reduced as the set point pressure is approached so as to reduce the average speed of the dump valve actuator when the system is near the set point or dead band pressure. This provides a more stable proportional control characteristic which reduces hunting and overshooting of the system. In practice, the result can be achieved by adding capacitance between branches of differential amplifier 26 so that the capacitor introduces a time constant due to its charging rate. When a relatively smaller error signal is present, a longer time will be required before a signal output from the differential amplifier will reach a point sufficient to provide a control signal output from level detector 28 due to the increased length of time required to charge the capacitor with the smaller error signal.

In summary, the control circuit causes dump valve actuator 31 to operate at full speed in the desired direction when a large error signal is present and operates at a relatively slower average speed, occasioned by the start-stop characteristic, when a smaller error signal is present until the discharge pressure falls within the dead band of the system. In practice, gain attenuator 55 may be switched into differential amplifier 26 about 20 milliseconds after the occurrence of a control signal output from level detector 28 and may be switched out of the circuit of the differential amplifier about 200 milliseconds after the termination of a control signal output from the level detector.

Because full motor current is always supplied to dump valve actuator 31 whenever a control signal is supplied to it from opening circuit 29 or closing circuit 30, the motor will exhibit full torque to accurately move the dump valve in the desired direction. However, since the motor is sequentially turned on, braked, and deenergized, the effective motor speed will be substantially below that of its full speed condition when the set point pressure is closely approached. By employing a control system in accordance with this invention, characteristics of a complicated proportional control are simulated with a relatively simple and inexpensive alternating current motor, and the effect of hunting of the control valve is materially reduced.

While a preferred embodiment of this invention has been described for purposes of illustration, it will be understood that other electrical circuitry of well-known design may be used to implement the control functions described herein. Further, the control system described herein may be employed in a pneumatic or fluid amplifier type of control using the principles herein described. In addition, the control may be employed in gas compression apparatus other than the air compression system illustrated herein.

We claim:

1. A method of operating a gas compression system including a gas compressor and a dump valve having an actuator for maintaining a desired discharge pressure, which comprises: sensing the compressed gas discharge pressure of said system to provide a discharge pressure signal which is a function of said gas discharge pressure; providing a set point pressure reference signal corresponding with a desired compressed gas discharge pressure; comparing said gas discharge pressure signal to said set point pressure signal to provide an error pressure signal; detecting the presence of an error pressure signal having a predetermined level indicative of a need to actuate said dump valve; providing a control signal to actuate said dump valve upon detecting said predetermined error pressure signal level; attenuating said error pressure signal a predetermined period of time after the occurrence of said control signal, thereby terminating the control signal if the attenuated error pressure signal has a level less than that of said predetermined level; continuing to attenuate said error pressure signal for a time after the termination of said control signal; and removing the attenuation from said error pressure signal after said period of time has elapsed to return the control system to its initial sensitivity for again actuating said dump valve actuator for a period of time in the event that said discharge pressure is still sufficiently different from said desired compressed gas discharge pressure to provide an error signal of said predetermined level in its unattenuated condition.

2. A method of operating a gas compression system as defined in claim 1 which includes the step of applying a braking signal to brake said dump valve actuator after terminating the passage of a control signal thereto to effectively brake further movement of said dump valve.

3. A method of operating a gas compression system as defined in claim 2 including the step of terminating the braking signal to said dump valve actuator a relatively short period of time after application thereof so as to prevent excessive heating of said actuator.

4. A method of controlling a gas compression system as defined in claim 1 including the step of reducing the length of the control signal as the discharge pressure approaches the set point pressure so as to further reduce the average speed of actuation of said dump valve as the desired pressure is approached.

5. A gas compression system for maintaining a controlled discharge pressure which comprises: a gas compressor having an inlet for gas to be compressed and an outlet for compressed gas; a dump valve for maintaining a desired compressed gas discharge pressure by venting compressed gas; a dump valve actuator for controlling said dump valve; sensing means for sensing the compressed gas discharge pressure of said system and providing a pressure signal functionally related thereto; circuit means for providing a desired set point pressure reference signal; circuit means for comparing said set point pressure reference signal to said compressed gas pressure signal to provide an error signal; a level detector for sensing the occurrence of an error signal of a predetermined magnitude and for passing a control signal to said discharge valve actuator to reposition said valve; attenuator means for selectively attenuating said error signal; time delay circuit means for actuating said attenuator means to attenuate the error signal passed to said level detector for a length of time after the occurrence of said control signal; and holding means for continuing the attenuation of said error signal for a period of time after the termination of a control signal output from said level detector to slow the operation of said dump valve control motor when the attenuated error signal is less than said predetermined magnitude, thereby reducing hunting of said dump valve as the desired compressed gas discharge pressure is approached.

6. A gas compression system as defined in claim 5 including a brake circuit for providing a braking signal to said dump valve actuator upon the termination of the passage of a control signal thereto to prevent further movement of said dump valve in the absence of a control signal, thereby reducing hunting of said dump valve.

7. A gas compression system as defined in claim 6 including timing means for terminating the application of said braking signal to said dump valve actuator after a relatively short period of time to prevent excessive heating of said actuator.

8. A gas compression system as defined in claim 5 wherein said circuit means for comparing said set point pressure reference signal to said compressed gas pressure signal comprises a differential amplifier, and wherein said attenuator means comprises circuit means to selectively reduce the gain of said differential amplifier.

9. A gas compresison system as defined in claim 5 including circuit means for establishing a dead band pressure range about the set point pressure within which an unattenuated error signal has an insufficient magnitude to provide a control signal output from said level detector.

10. A gas compression system as defined in claim 5 including timing means for reducing the length of the control signal as the system approaches the set point pressure to further slow the average rate of actuation of said valve as the desired system pressure is approached.

References Cited

UNITED STATES PATENTS

| | | | |
|---|---|---|---|
| 2,696,345 | 12/1954 | Hopper | 230—115 |
| 2,938,536 | 5/1960 | Ehremberg | 103—11 |
| 3,007,414 | 11/1961 | Long et al. | 230—115 |
| 3,968,796 | 12/1962 | Pfluger et al. | 103—11 X |
| 3,092,305 | 6/1963 | Bresenoff | 230—2 |
| 3,095,532 | 6/1963 | Floyd | 103—11 X |
| 3,282,217 | 11/1966 | Slover et al. | 103—11 |
| 3,292,845 | 12/1966 | Hens et al. | 230—115 |

WILLIAM L. FREEH, *Primary Examiner.*